(12) United States Patent
Friedrichs et al.

(10) Patent No.: US 6,450,053 B1
(45) Date of Patent: Sep. 17, 2002

(54) DEVICE FOR ENSURING CORRECT TOOTH ENGAGEMENT DURING COUPLING OF TWO GEARWHEELS

(75) Inventors: Jens Friedrichs, Neckargemünd; Peter Heiler, Forst; Arno Kern, Kraichtal; Frank Kropp, Mauer; Frank Schaum, Neckargemünd, all of (DE)

(73) Assignee: Heidelberger Druckmaschinen, Heidelberg (DE)

( * ) Notice: Subject to any disclaimer, the term of this patent is extended or adjusted under 35 U.S.C. 154(b) by 16 days.

(21) Appl. No.: 09/708,281

(22) Filed: Nov. 8, 2000

(30) Foreign Application Priority Data

Nov. 8, 1999 (DE) .......................................... 199 53 664

(51) Int. Cl.[7] ............................. F16H 3/34; B05C 11/00
(52) U.S. Cl. ............................. 74/352; 74/395; 74/440; 118/46
(58) Field of Search ............................ 74/8, 352, 353, 74/354, 395, 440; 118/46

(56) References Cited

U.S. PATENT DOCUMENTS 5,983,795 A * 11/1999 Stein et al. .................. 101/218
6,302,021 B1 * 10/2001 Wadlinger .................. 101/232

FOREIGN PATENT DOCUMENTS

DE           42 26 292 A1    2/1993

OTHER PUBLICATIONS (Koehler et al.), dated Dec. 27, 1990; International Patent Publication No.: WO 90/15671.

* cited by examiner

Primary Examiner—Allan D. Herrmann
(74) Attorney, Agent, or Firm—Laurence A. Greenberg; Werner H. Stemer; Gregory L. Mayback

(57) ABSTRACT

A device for ensuring correct tooth engagement during coupling of an adjustable, first gearwheel to a second gearwheel of a printing-material processing machine, includes a first adjustment device for adjusting the first gearwheel in a direction towards the second gearwheel during coupling, and further includes a protrusion and a guide for guiding the protrusion during the coupling, the protrusion being disposed eccentrically to one of the two gearwheels and being connected to the one gearwheel, so that, during rotation of the one gearwheel about a central axis thereof, the protrusion is rotatable together with the one gearwheel.

14 Claims, 4 Drawing Sheets

DEVICE FOR ENSURING CORRECT TOOTH ENGAGEMENT DURING COUPLING OF TWO GEARWHEELS

BACKGROUND OF THE INVENTION

Field of the Invention

The invention relates to a device for ensuring correct tooth engagement during coupling of two gearwheels, more specifically, an adjustable first gearwheel to a second gearwheel of a printing-material-processing machine, the engagement-ensuring device comprising a first adjustment device for adjusting the first gearwheel in a direction towards the second gearwheel during coupling, and also comprising a protrusion and a guide for guiding the protrusion during coupling.

Such devices are necessary in order for decoupled gearwheels to be brought together into a precise position during coupling to form a gear train.

In a device corresponding to the general type mentioned in the introduction hereto and described in the published German Patent Application DE 42 26 392 C1, a spring bolt is arranged on a first gearwheel that is accommodated in a pivotable frame member, and a segment ring with a centering groove is arranged on a second gearwheel accommodated in a stationary frame member. Although the spring bolt is pivotable about an articulating joint connecting the pivotable frame member to the stationary frame member, it cannot be pivoted about the central axis of the first gearwheel because the spring bolt is fastened to the pivotable frame member by a link. Before coupling of the first gearwheel, the latter is arrested by a catch, and the second gearwheel is positioned more-or-less at a couple location by a machine drive. Thereafter, the pivotable frame member is pivoted, together with the first gearwheel, about the articulating joint in the direction of the stationary frame member, the spring bolt sliding in the centering groove and the rotatable second gearwheel being aligned relative to the arrested first gearwheel so that a given tooth of the first gearwheel is guided into a tooth gap of the second gearwheel, which is provided for the tooth. During the introduction of the given tooth of the first gearwheel into the tooth gap, the first gearwheel must be moved by the pivoting motion somewhat in the radial direction of the second gearwheel so that the so-called insertion direction of the given gearwheel corresponds thereto. The tooth has already passed into the tooth gap, and the gear train is thus closed, before the spring bolt has completely passed through the centering groove and enables a rotary movement of the second gearwheel again.

An unfavorable feature of the device described in the aforementioned German patent document is that, if a second gearwheel is not positioned sufficiently precisely in the coupling position, the spring bolt comes into contact with the segment ring and blocks further movement of the pivotable frame member relative to the stationary frame member, as a result of which the coupling operation is stopped. In this case, a renewed attempt to position the second gearwheel sufficiently precisely in the coupling position is necessary in order for the centering groove to be positioned precisely relative to the spring bolt.

For reasons explained hereinbelow, in so-called "long printing machines" with a large number of printing or varnishing units arranged in a row, such precise positioning of the second gearwheel is not always possible. The gearwheels of the impression cylinder of the printing or varnishing units are connected, via gearwheels of sheet-transporting drums, to form a continuous gear train. A given driving gearwheel of the gear train is connected to an electromotive central drive, which, via the gear train, rotatively drives each of the gearwheels of the gear train.

When the central drive is at a standstill, the driving gearwheel virtually cannot rotate. The greater the number of gearwheels located between the driving gearwheel and a driven gearwheel of the gear train, the more the driven gearwheel can be rotated when the printing machine is at a standstill. This results from each gearwheel pairing being affected by tooth clearance. The greater the number of gearwheel coupling locations provided between the driving gearwheel and the driven gearwheel, the greater the sum of the amounts of coupling-location tooth clearance, it being possible for the driven gearwheel to be rotated by that sum.

A gearwheel which is the farthest remote from the driving gearwheel in the gear train can thus be rotated by the greatest amount. For example, the gearwheel may have assigned thereto an impression cylinder of a varnishing unit arranged at the end of the printing machine and it may correspond to the second gearwheel described in the aforementioned German patent document and to be positioned in the coupling position.

Due to the sum of the amount of tooth clearance of the other gearwheels in the gear train up to the second gearwheel, it is not possible for the second gearwheel to be positioned reliably by the central drive, with the result that it is often the case that the spring bolt comes into contact with the segment ring, and position corrections are thus necessary.

A further disadvantage of the device described in the aforementioned German patent Document is apparent if the second gearwheel, to which the first gearwheel is to be coupled, is the driving gearwheel itself, which is connected to the central drive, or is a gearwheel in the gear train which is located in close proximity to the driving gearwheel. In this case, with the central drive at a standstill, the second gearwheel could only be rotated to a slight extent, if at all, because, between the central drive and the second gearwheel, there is too little total tooth clearance, if any at all, necessary for the rotation of the second gearwheel. In other words, absolutely precise positioning of the second gearwheel in the coupling position would be necessary for the centering groove to be centered precisely relative to the spring bolt. Even if the centering groove is offset slightly relative to the spring bolt, in which case the latter comes into contact with a beveling of the centering groove, coupling of the first gearwheel to the second gearwheel would not be possible because the spring bolt could not force the centering groove, and thus the second gearwheel, out of the rotary position secured by the central drive.

It is thus the case that the device described in the aforementioned German patent document is unsuitable not only for coupling the gearwheels of the varnishing unit which is arranged downline, as viewed in the printing-material transporting direction, of a large number of printing units, is thus remote from the central drive and is used, for example, for the concluding application of a clear protective varnish to a printed image, but also for coupling gearwheels of a varnishing unit which is arranged upline of a large number of printing units, is thus in the vicinity of the central drive and is used, for example, for the application of a zinc white primer to the printing material before the latter is printed in the printing units.

SUMMARY OF THE INVENTION

It is accordingly an object of the invention thus to provide a device for ensuring correct engagement of a tooth of a first gearwheel in a second gearwheel, wherein the position of the second gearwheel within a gear train of a printing-material processing machine is not important for disruption-free coupling.

With the foregoing and other objects in view, there is provided, in accordance with one aspect of the invention, a device for ensuring correct tooth engagement during coupling of an adjustable, first gearwheel to a second gearwheel of a printing-material processing machine, comprising a first adjustment device for adjusting the first gearwheel in a direction towards the second gearwheel during coupling, and further comprising a protrusion and a guide for guiding the protrusion during the coupling, the protrusion being disposed eccentrically to one of the two gearwheels and being connected to the one gearwheel, so that, during rotation of the one gearwheel about a central axis thereof, the protrusion is rotatable together with the one gearwheel.

In accordance with another feature of the invention, the one gearwheel to which the protrusion is connected is the first gearwheel.

In accordance with a further feature of the invention, the first gearwheel is mounted in the first adjustment device for adjusting the central axis of the first gearwheel along a straight line from a first position, wherein the first gearwheel is decoupled from the second gearwheel, into a second position wherein the first gearwheel is coupled to the second gearwheel.

In accordance with an added feature of the invention, the guide is a so-called open guide for guiding the protrusion only on one side.

In accordance with an additional feature of the invention, the gearwheels are provided with a respective helical toothing, and the guide and the protrusion are adapted to the helical toothings.

In accordance with yet another feature of the invention, the protrusion is formed with a supporting surface which is inclined in accordance with an angle of skew of the toothing of the first gearwheel.

In accordance with yet a further feature of the invention, a guide surface of the guide is inclined in accordance with an angle of skew of the toothing of the second gearwheel.

In accordance with yet an added feature of the invention, one of the gearwheels has assigned thereto a second adjustment device for adjusting the one gearwheel relative to the other of the two gearwheels in the axial direction of the one gearwheel.

In accordance with yet an additional feature of the invention, the first gearwheel has assigned thereto the second adjustment device for adjusting the first gearwheel axially parallel to the second gearwheel.

In accordance with still another feature of the invention, connected to the axially adjustable first gearwheel so as to be fixed against rotation relative thereto is a cylinder disposed coaxially with the first gearwheel, and the second adjustment device, together with the gearwheels, forms a device for adjusting a circumferential register of the cylinder.

In accordance with still a further feature of the invention, the guide is connected to the other gearwheel.

In accordance with still an added feature of the invention, one of the two gearwheels is formed of a basic wheel and an auxiliary wheel, the basic wheel and the auxiliary wheel having assigned thereto at least one spring for bracing in a circumferential direction.

In accordance with still an additional feature of the invention, the gearwheel formed of the basic wheel and the auxiliary wheel is the first gearwheel.

In accordance with a concomitant aspect of the invention, there is provided a printing-material processing machine having a device for ensuring correct tooth engagement during coupling of an adjustable, first gearwheel to a second gearwheel of a printing-material processing machine, the ensuring device comprising a first adjustment device for adjusting the first gearwheel in a direction towards the second gearwheel during coupling, and further comprising a protrusion and a guide for guiding the protrusion during the coupling, the protrusion being disposed eccentrically to one of the two gearwheels and being connected to the one gearwheel, so that, during rotation of the one gearwheel about a central axis thereof, the protrusion is rotatable together with the one gearwheel.

The ensuring device according to the invention is distinguished in that the protrusion is arranged eccentrically with respect to one of the two gearwheels (the first gearwheel or the second gearwheel) and is connected to the gearwheel, with the result that, during rotation of the gearwheel about a central axis thereof, the protrusion rotates together with the gearwheel.

One advantage of the ensuring device according to the invention is that, in the device, rotatability of the second gearwheel for the coupling of the first gearwheel is not necessary. It is also the case with the ensuring device according to the invention that there is no need for the first gearwheel to be arrested and, during coupling, the first gearwheel can be aligned in relation to the second gearwheel.

A further advantage of the ensuring device according to the invention can be seen in that the second gearwheel no longer has to be positioned as precisely in the coupling position. Even if the second gearwheel is only positioned roughly in the coupling position, because of the total tooth clearance provided, assurance is always provided that a given tooth of the first gearwheel is guided into a tooth gap of the second gearwheel provided for that given tooth. In the ensuring device according to the invention, there is thus no need for any corrections in the rotary position of the second gearwheel, and proper gearwheel coupling is achieved the very first time in each case.

It is also advantageous that, as the given tooth dips or passes into the tooth gap, the adjustment direction of the first gearwheel may differ from the radial direction of the second gearwheel and the insertion direction of the given tooth. In other words, as the tooth of the first gearwheel dips or passes into the tooth gap of the second gearwheel, the center point of the first gearwheel can be adjusted in a direction other than that extending through the center point of the second gearwheel.

In an embodiment which is advantageous in terms of an angle-of-rotation or rotary-angle alignment of the first gearwheel with the second gearwheel during coupling, the protrusion, which is an element other than the teeth of the first gearwheel, is fastened or integrally formed on the first gearwheel.

In an embodiment which is advantageous in terms of a non-axially parallel adjustment of the first gearwheel in the direction towards the second gearwheel during coupling, and away therefrom during decoupling, by a chain whereon the first gearwheel is suspended, the first adjustment device is constructed for linearly adjusting the first gearwheel from a spaced-apart position into an engagement position relative to the second gearwheel. The first adjustment device, for the vertical adjustment of the first gearwheel from the spaced-apart position into the engagement position and back, is preferably constructed as a chain transmission.

In an embodiment which is advantageous in terms of the protrusion being positioned on the guide transversely to the guidance direction of the guide, the guide is a purely force-coupled, and thus formlocking-free, slide guide. In this regard, it is noted that a formlocking connection is one which connects two elements together due to the shape of the elements themselves, as opposed to a forcelocking connection, which locks the elements together by force external to the elements.

In an embodiment which is advantageous in terms of the spur-gear pairing formed from the gearwheels running more smoothly, the gearwheels are provided with helical toothing aligned obliquely relative to the axes of the gearwheels, the protrusion and the guide being constructed so as to correspond to the helical toothing. The latter advantageously allows the first gearwheel to be coupled to the second gearwheel irrespective of different axial positions of the first gearwheel relative to the second gearwheel.

In an embodiment which is advantageous in terms of the protrusion being formed as a counterpart adapted three-dimensionally to the guide, a supporting surface of the protrusion, which abuts the guide, corresponds, in terms of angle of skew and direction of slope, to the toothing of the first gearwheel. In this embodiment, the guide has a surface which corresponds, in terms of angle of skew and direction of slope, to the toothing of the second gearwheel and against which the protrusion abuts and along which, during coupling, the protrusion either slides as a sliding block or rolls as a cam roller, depending upon the form of the protrusion. The angles of skew of the gearwheels are equal to one another, with the result that the angles of skew of the protrusion and of the guide are also equal to one another. The directions of slope of the toothing of the gearwheels are directed counter to one another, and those surfaces of the protrusion and of the guide which come into contact with one another thus also slope in opposite directions. For example, the first gearwheel is provided with toothing which slopes to the left, the tooth-flank lines of which extend in a counterclockwise direction, and the second gearwheel is provided with toothing which slopes to the right, the tooth-flank lines of which extend in a clockwise direction.

In an embodiment which is advantageous in terms of an adjustment of the rotational phase position of one axially displaceably mounted gearwheel (of the first or the second gearwheel) relative to the other gearwheel with the gearwheels in engagement with one another and rotating, one of the two gearwheels has assigned thereto an adjustment device for displacing the gearwheel in the axially parallel direction relative to the other gearwheel, the adjustment device being referred to hereinbelow as the second adjustment device.

In an embodiment which is advantageous in terms of an adjustment of the rotational phase position of the couplable and decouplable, first gearwheel relative to the second gearwheel, the first gearwheel is mounted so that it can be displaced not just perpendicularly to the axial direction of the second gearwheel for coupling purposes, but also in an axial parallel manner relative to the second gearwheel, by the second adjustment device, in the coupled state.

In an embodiment which is advantageous in terms of the adjustment of the position of the print start of a printing or varnishing form on an application cylinder, which is connected to the first gearwheel, relative to the leading edge of the printing-material sheets on an impression cylinder, which is connected to the second gearwheel, the gearwheels, together with the second adjustment device, form a register-adjustment device for the application cylinder.

In an embodiment which is advantageous in terms of the guide being used as an abutment which rotates the protrusion during coupling, the guide is fastened or integrally formed eccentrically on the second gearwheel.

In an embodiment which is advantageous in terms of minimizing the tooth clearance, the second or preferably first gearwheel comprises a basic wheel and an auxiliary wheel which is arranged rotatably and coaxially in relation to the basic wheel and is braced with the basic wheel in the circumferential direction by at least one spring.

The ensuring device according to the invention and the embodiments thereof are suitable particularly for ensuring the correct tooth engagement of two gearwheels of a printing or varnishing unit of a rotary printing machine.

Other features which are considered as characteristic for the invention are set forth in the appended claims.

Although the invention is illustrated and described herein as embodied in a device for ensuring correct tooth engagement during coupling of two gearwheels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
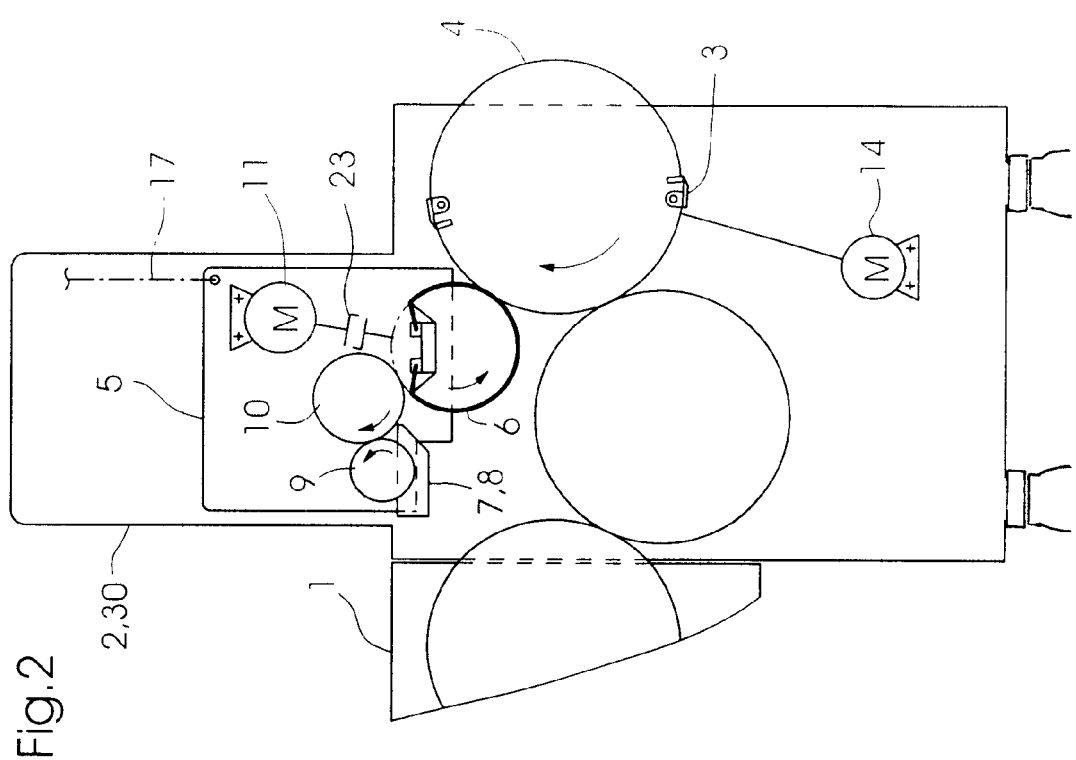
FIG. 1 is a diagrammatic side elevational view of a varnishing unit with an impression cylinder, and an application cylinder that has been displaced into a passive position, wherein it is drawn back distal or remote from the impression cylinder.
Figure 2:
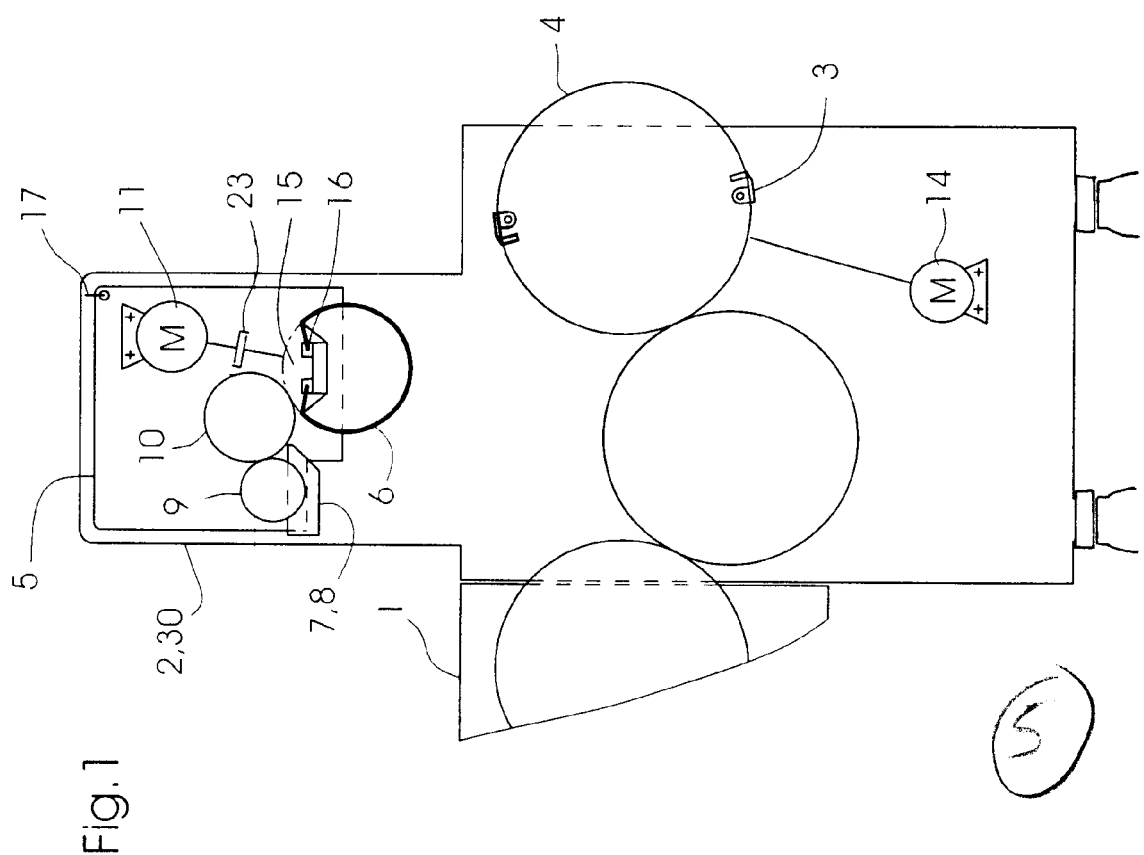
FIG. 2 is a view like that of FIG. 2, wherein the application cylinder has been displaced from the passive position thereof into an active position wherein it is in engagement with the impression cylinder.
Figure 3:
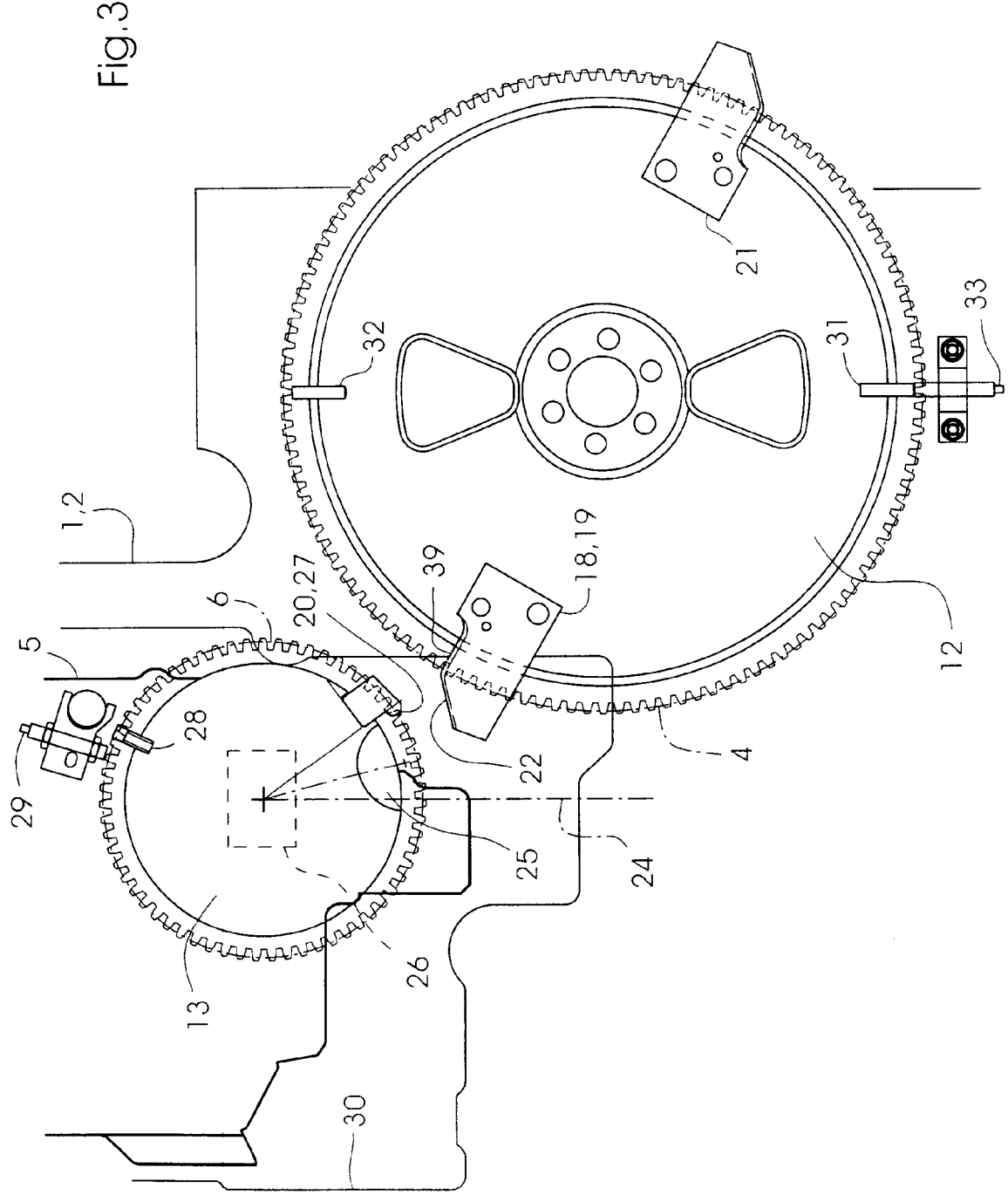
FIG. 3 is a side elevational view of a gearwheel of the impression cylinder and a gearwheel of the application cylinder, the latter gearwheel being as yet decoupled from the former, as well as a device assigned to the gearwheels and serving for ensuring a correct tooth engagement during a coupling of the gearwheel of the application cylinder to the gearwheel of the impression cylinder, in accordance with the invention.

Referring now to the drawings and, first, particularly to FIG. 1 thereof, there is shown therein in detail a fragmentary detail of a printing-material processing machine 1. The machine 1 is a rotary printing machine with a number of offset printing units, which are not specifically illustrated. The fragmentary view shows, diagrammatically, a varnishing unit 2 of the machine 1, the varnishing unit being arranged downline of the offset printing units, as viewed in the printing-material transporting direction. The unit 2 includes an impression cylinder 4, which is equipped with grippers 3, arranged in two diametrically opposite rows, for retaining a sheet-like printing material, and also includes an assembly unit 5 which can be displaced selectively into an active position (note FIG. 2) or a passive position (note FIG. 1).

The assembly unit 5, which is movable up and down, includes an application cylinder 6 for applying varnish to the printing material resting on the cylinder 4, and a metering device 7 for a metered feeding of varnish to the cylinder 6. The device 7 includes a storage pan or trough 8 wherein there is provided a supply of varnish and wherein there is arranged a dipping roller 9 for drawing the varnish out of the pan 8. The device 7 also includes a metering roller 10 which, together with the roller 9, produces a varnish film, and transfers the varnish from the roller 9 to the cylinder 6.

In order to use the assembly unit 5 for varnishing, it can be adjusted into the active position. For the maintenance of the assembly unit 5 or, in order to print printing material in the offset printing units and in order to convey the printed printing material through the unit 2 in a smear-free manner without subsequent varnishing in the unit 2, i.e., without any risk of the printing-material sheet striking against the cylinder 6, the assembly unit 5 can be adjusted into the passive position thereof. The cylinder 6 may have a rubber blanket stretched over the surface thereof as a cylinder dressing for varnishing the entire surface area of the printing material, or a flexographic printing form for spot varnishing. Of course, instead of the varnish, it is also possible for an ink to be used by the unit 2 for printing purposes.

By an electromotive auxiliary drive 11 belonging to the assembly unit 5, the cylinder 6 is slowly rotatable, with the assembly unit 5 adjusted into the passive position, in order to be able to wipe off the cylinder 6, in order for the cylinder dressing to be drawn onto the cylinder 6 or in order to avoid setting or drying of the varnish on the cylinder 6. The drive 11 is connected to the cylinder 6 via a clutch 23, which is released when the assembly unit 5 is located in the active position thereof and the ink-conducting or varnish-conducting cylinder 6 rolls on the printing material. The clutch 23 is connectable and releasable selectively by remote control, e.g., via a control gear transmission. The control gear transmission may include, for example, a dog or projection which is fastened to the frame 30, the clutch 23 striking against the projection, and thus being actuated thereby, when the assembly unit 5 with the clutch 23 passes the projection. Following the release of the clutch 23, the cylinder 6, because of the imbalance thereof caused by a cylinder gap 15, rotates into a center-of-gravity position wherein the cylinder gap 15 is oriented upwardly. With the assembly unit 5 adjusted into the active position thereof, the cylinder 6 is no longer rotatively driven by the drive 11, but rather, via a gear transmission, by an electromotive main drive 14 of the machine 1.

The gear transmission includes a gearwheel 12, which is arranged coaxially with the cylinder 4 and is connected thereto so as to be fixed against rotation relative thereto, and a gearwheel 13, which is arranged coaxially with the cylinder 6 and is connected to the cylinder 6 so as to be fixed against rotation relative thereto. The gearwheels 12 and 13 mesh with one another when the cylinder 6 is located in the active position thereof (note FIG. 2). During varnishing, the drive 14 thus drives the cylinder 4 together with the cylinder 6, which has been brought into engagement with the cylinder 4, the number of teeth of the radially toothed gearwheels 12 and 13 ensuring synchronization of the rotation of the cylinder 6, with the result that the circumferential-surface speed of the latter corresponds to that of the cylinder 4. The gearwheels 12 and 13, which have been pushed onto journals of the cylinders 4 and 6 so as to be fastened, have different pitch diameters. The pitch diameter of the gearwheel 12 is twice the size of the pitch diameter of the gearwheel 13, thereby ensuring that, with each full revolution of the so-called double-size cylinder 4, the so-called single-size cylinder 6 executes precisely two complete revolutions.

When the cylinders 4 and 6 run synchronously on one another, with each revolution of the cylinder 6, the grippers 3 dip into the cylinder duct 15, wherein a clamping device 16 is arranged for clamping the cylinder dressing.

During the coupling of the gearwheels 12 and 13, the teeth of the gearwheel 13 are brought into engagement with the teeth of the gearwheel 12. Before the coupling of the gearwheels 12 and 13, which takes place as the conclusion to the adjustment of the assembly unit 5 from the passive position thereof into the active position thereof, the adjustment being effected by a chain gear transmission 17 (first adjustment device), the gearwheels 12 and 13 have to be aligned in given rotary-angle positions relative to one another in order to ensure that, following the coupling, a given tooth of the gearwheel 13 is located in a tooth gap of the gearwheel 12 intended for that tooth. The latter is the precondition for a collision-free and in-register rotation of the cylinders 4 and 6, after the coupling and during the varnishing, the grippers dipping into the cylinder gap 15 without colliding with the clamping device 16, and the print start of the cylinder dressing being located in a correct position relative to the grippers 3 and, thus, relative to the print start of the printing material. It is consequently necessary to rotate the gearwheel 13, and thus also the cylinder 6, when the teeth of the gearwheel 13 are brought into engagement with the teeth of the gearwheel 12.

For rotating the gearwheel 13 from the rotary-angle position thereof assumed, due to the imbalance, after the release of the clutch 23, and for preliminarily positioning the gearwheel, a cam gear transmission 18 is provided, which includes at least one plate-like cam 19 arranged on the front side of the gearwheel 12, and a block-like protrusion or boss 20, which is arranged on the gearwheel 13 and is guided by the cam 19. The protrusion 20 and the cam or guide 19 are thus arranged on different gearwheels 12 and 13. Because the cylinder 6, depending upon the rotary-angle position of the cylinder 4 following the standstill of the latter, can be aligned in the circumferential direction with one or the other row of grippers 3, it is possible for the given tooth of the gearwheel 13 to engage not just in the aforementioned tooth gap of the gearwheel 12, but also in a further tooth gap of the gearwheel 12, located diametrically opposite the first-mentioned tooth gap. A further cam 21 of corresponding construction is thus provided on the gearwheel 12, diametrically opposite the cam 19, and is likewise provided for guiding the protrusion 20, formed as a sliding block.

Each of the cams 19 and 21, which are mutually offset an angle of 180° relative to one another, has an end-side guide surface 22 angled-away relative to a radial line of the gearwheel 12 passing through the surface 22, so that, during rotation of the interengaging gearwheels 12 and 13, a collision between each cam 19 and 21 and the protrusion 20 is ruled out. When, during the rotation of the interengaging gearwheels 12 and 13, the given tooth of the gearwheel 13 is located in the tooth gap of the gearwheel 12 intended for the tooth during coupling, and the protrusion 20 is thus located directly alongside the cam 19, as is illustrated in FIG. 5, the surface 22 extends, in the direction of the gearwheel 13, at an increasing distance from the protrusion 20 and there is no contact between the protrusion 20 and the cam 19.

So that the cams 19 and 21, which project beyond the toothing of the gearwheel 12 in the radial direction of the latter, do not collide with the gearwheel 13 during the rotation, the gearwheel 13 is formed with a circumferential cutout 25 into which the cams 19 and 21 dip during the rotation of the meshing gearwheels 12 and 13.

Figure 5:
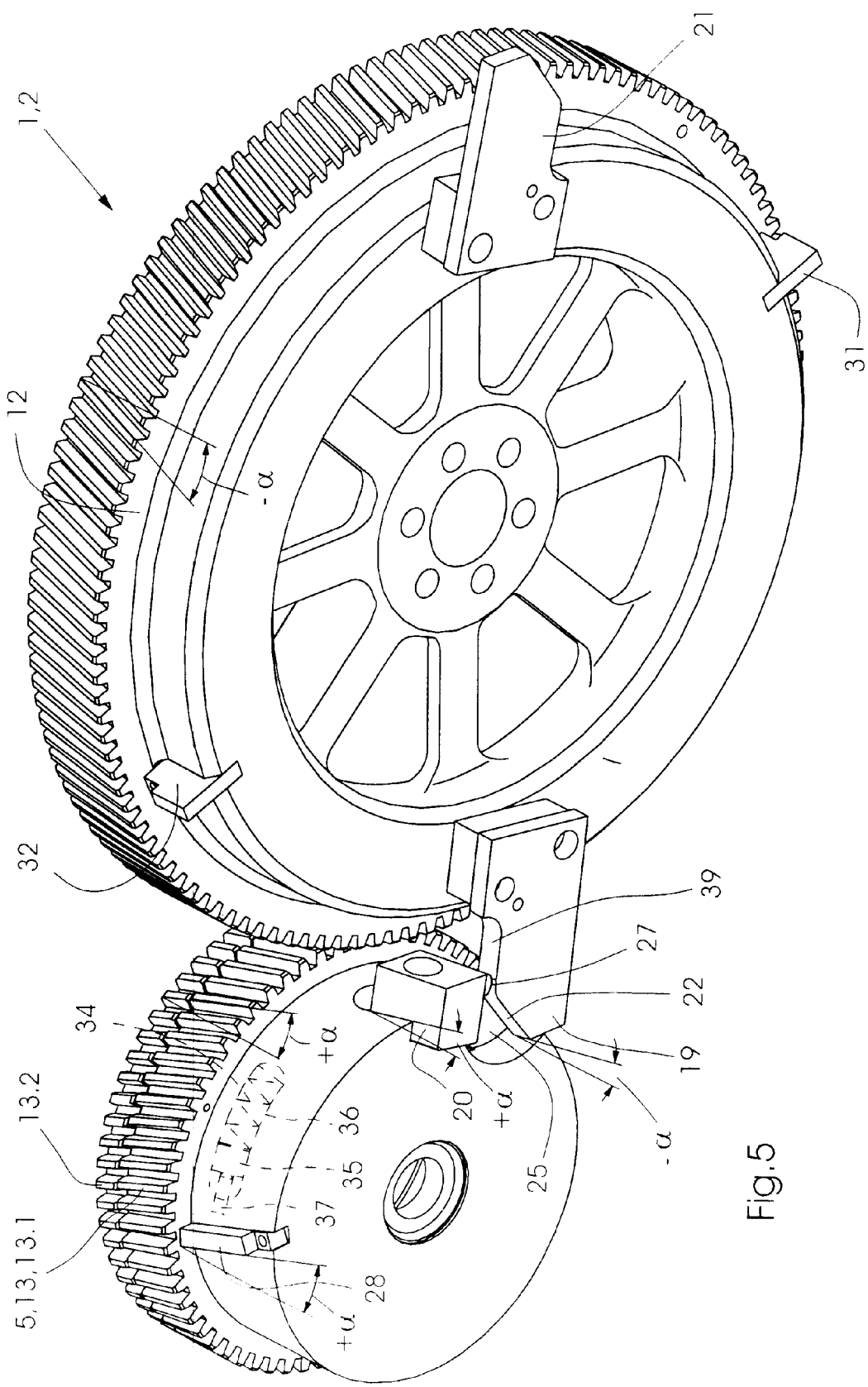
FIG. 5 is a somewhat enlarged perspective view of the mutually coupled gearwheels of FIG. 4, the view showing an angular adaptation of the device for ensuring the correct tooth engagement to helical toothing of the gearwheels, and an angular adaptation of a marking determinable by a sensor, to helical toothing of the gearwheel of the application cylinder, as well as a construction of the application-cylinder gearwheel that includes parts which are braced relative to one another in order to minimize the tooth clearance.

In order to achieve good smooth running, the gearwheels 12 and 13 are provided with helical toothing, the helix angles −α and +α of which are shown in FIG. 5. The helical toothing also serves for adjusting the circumferential register of the cylinder 6.

For the circumferential-register adjustment, a register-adjustment device 26 (second adjustment device) serves for adjusting the gearwheel 13 engaged with the gearwheel 12, in the axial direction of the gearwheel 12 by an amount proportional to the required register correction, a circumferentially active actuating force of the abutment-forming oblique tooth flanks of the axially secured gearwheel 12 being exerted on the oblique tooth flanks of the gearwheel 13, which slide along the first-mentioned oblique tooth flanks. Due to the actuating force, the gearwheel 13, and the cylinder 6 therewith, are forced in the circumferential direction relative to the gearwheel 12 and to the cylinder 4, and thus rotated into an in-register rotary-angle position.

If it is assumed that, in contrast with the aforedescribed exemplary embodiment, the surface 22 of the cams 19 or 21 are to run parallel to the axial direction of the gearwheel 13, an incorrect positioning of the protrusion 20 relative to the surface 22 following the register adjustment would result. Due to the incorrect positioning, there would be a risk that the play which is necessary when the gearwheels 12 and 13 rotate with the teeth thereof engaged, between the protrusion 20 and the cams 19 and 21, which move past the latter, would no longer be provided, which would result in a striking of the protrusion 20 against the cams 19 and 21 during each revolution.

In order to avoid such collisions and to take into account the offset in angle of rotation caused by the register adjustment, the cams 19 and 21 and the protrusion 20, in the described exemplary embodiment, are contoured three-dimensionally and aligned matching the helical toothing. The three-dimensional cam profiling ensures that the different axial positions of the gearwheel 13 do not influence in any way the straightforward coupling of the gearwheel 13 with the gearwheel 12. In other words, the surface 22 has the same inclination as the toothing of the gearwheel 12 relative to the axis of rotation of the latter, and a supporting surface 27 of the protrusion 20 has the same inclination as the toothing of the gearwheel 13 relative to the axis of rotation/central axis 40 of the latter. The axial adjustment thus causes the surface 27 to be displaced parallel to the surface 22.

A marking 28 in the form of a so-called lug is provided on the gearwheel 13 in a manner offset at an angle to the protrusion relative to the central axis 40 of the gearwheel 13. The marking 28 is detectable by an electric-signal emitting sensor 29 which is fastened on the assembly unit 5. If the marking 28 is located precisely opposite the sensor 29, the latter detects the fact that the gearwheel 13 is located in the necessary rotary-angle position and the gearwheels 12 and 13 are in correct engagement with one another. A rotary-angle position of the marking 28 other than the precisely opposite position indicates to the sensor 29 that, for example, as a result of unauthorized operator intervention during the coupling, incorrect coupling has taken place.

So that the axial displacement of the gearwheel 13 for register adjustment is also compensated for in terms of the position of the marking 28 relative to the sensor 29, the marking 28 extends at the helix angle +α of the helical toothing of the gearwheel 13 relative to a parallel of the center axis 40. Due to the oblique position of the marking 28, in each of the different axial positions of the gearwheel 13, a different section of the marking 28, which is in the form of a strip in plan view, comes into position opposite the sensor 29 in order to indicate to the sensor 29 the same correct rotary-angle position of the gearwheel 13 for all the different axial positions.

Markings 31 and 32 are provided on the gearwheel 12 diametrically opposite to one another and in a manner offset at an angle to the cams 19 and 21, the markings 31 and 32 being formed as lugs provided on the gearwheel 12. For monitoring proper coupling of the gearwheels 12 and 13, the correct rotary-angle position of the gearwheel 12 being checked by the markings 31 and 32. In this regard, the marking 31 serves for monitoring during the coupling of the gearwheel 13 in the tooth gap of the gearwheel 12 located at the cam 19, and the marking 32 serves for monitoring during the coupling of the gearwheel 13 in the tooth gap of the gearwheel 12 located at the cam 21. A sensor 33, which is fastened to a frame 30 of the machine 1 and likewise emits an electric signal, in this regard, detects the correct rotary-angle position of the gearwheel 12 by way of the respective marking 31 or 32 being located precisely opposite the sensor 33 Because the gearwheel 12 is not displaced in the axial direction thereof during the register adjustment, the markings 31 and 32 are aligned in an axially parallel manner relative to the axis of rotation of the gearwheel 12.

When the teeth of the gearwheels 12 and 13 are in correct engagement with one another, the protrusion 20 has lost contact with the cam 19 or 21 used for the respective coupling operation, the surface 27 being located out of contact with a flank 39 of the cam 19 or 21, but being disposed close to the latter.

Figure 4:
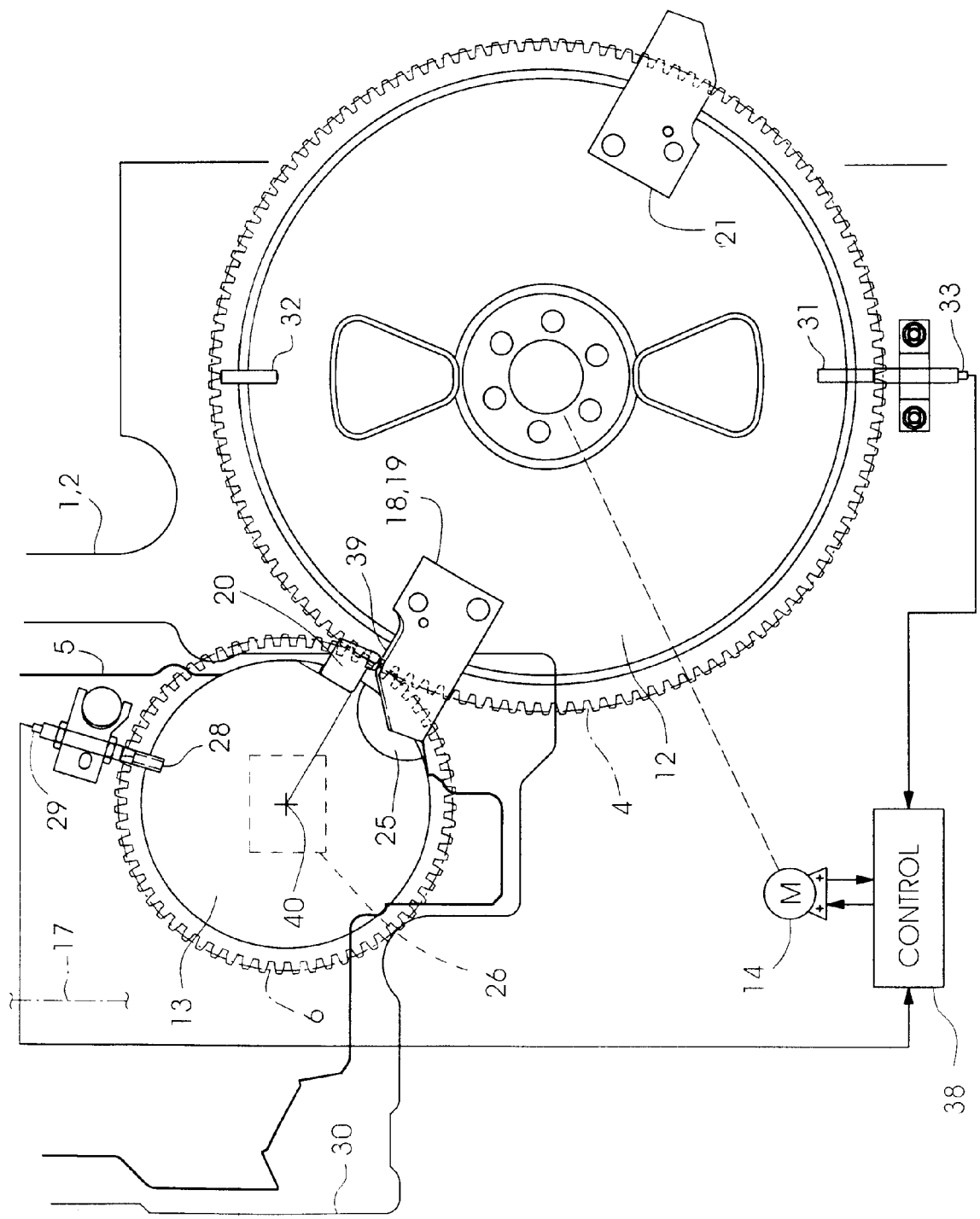
FIG. 4 is a view like that of FIG. 3, showing the gearwheels in coupling engagement and in the active position of the application cylinder according to FIG. 2.

After coupling has taken place, the correct position of the cylinder 6 is checked by the sensor 29 with reference to the position of the marking 28, and the correct position of the cylinder 4 is checked by the sensor 33 with reference to the position of the marking 31 or 32 corresponding to the cam 19 or 21 used during the coupling, this being the marking 31 in FIG. 4. The electronic control device 38, which is linked to the sensors 29 and 33 and to the drive 14, allows the drive 14 only to rotate the gearwheels 12 and 13 and the cylinders 4 and 6 when the sensor 33 confirms the correct position of the gearwheel 12 brought about by the drive 14, and the sensor 29, at the same time, confirms that the correct tooth has been introduced into the tooth gap intended therefor. If these preconditions are satisfied, the drive 14 can be activated for varnishing purposes, the drive 14 not only driving, via the gearwheel 12, the gearwheel 13, i.e. the wheels 13.1 and 13.2 together, as explained hereinbelow, but also rotates, via the gearwheel 13, the non-illustrated gearwheels assigned coaxially to the rollers 9 and 10 for driving the same.

The gearwheel 13 has a plurality of parts and includes a basic wheel 13.1 and an auxiliary wheel 13.2, which is seated rotatably on a shoulder of the basic wheel 13.1. A protrusion 35 which is axially parallel to the central axis 40 projects into a circular arc-shaped groove 36 formed in the basic wheel 13.1, the groove 36 being concentric with the central axis 40. In order to brace the auxiliary wheel 13.2 relative to the basic wheel 13.1, a helical spring 34 within the groove 36 is supported, at one end, on the basic wheel 13.1 and, at the other end thereof, on the protrusion 35 and, via the latter, on the auxiliary wheel 13.2, with the result that the protrusion 35 is forced against a stop 37 which can be adjusted approximately in the circumferential direction of the basic wheel 13.1. The stop 37 is a screw which can be screwed into the basic wheel 13.1 to a greater or lesser extent in the direction of action of the spring 34 and in the longitudinal direction of the groove 36. By a corresponding adjustment of the stop 37, the rotation of the auxiliary wheel 13.2 relative to the basic wheel 13.1 is limited by the spring 34 to such an extent that, with the gearwheels 12 and 13 disengaged from one another, a tooth gap of the auxiliary wheel 13.2 is displaced from an approximate alignment thereof with a tooth gap of the basic wheel 13.1 only to such a slight extent that, during the coupling of the gearwheels 12 and 13, a tooth of the gearwheel 12 can simultaneously be pushed into the mutually displaced tooth gaps and, by virtue of the tooth being pushed in, the tooth gap of the auxiliary wheel 13.2 is forced back again into the operating position thereof, essentially aligned with the tooth gap of the basic wheel 13.1. In other words, by virtue of the single adjustment thereof which takes place when the wheels 13.1 and 13.2 are combined to form the gearwheel 13, the stop 37 prevents the situation wherein a tooth gap of the gearwheel 13 which is divided in two into a tooth gap of the basic wheel 13.1 and a tooth gap of the auxiliary wheel 13.2 snaps or springs closed at a too-great extent when the gearwheel 13 has been decoupled from the gearwheel 12, so that no recoupling of the gearwheel 13 and the gearwheel 12 would be possible because a tooth of the auxiliary wheel 13.2 which is adjacent to the tooth gap of the auxiliary wheel 13.2 would be standing virtually in alignment with the tooth gap of the basic wheel 13.1. The stop 37 thus keeps the tooth gaps of the wheels 13.1 and 13.2 in a sufficiently concurrent position for the coupling of the tooth of the gearwheel 12. When the gearwheels 12 and 13 rotate in engagement with one another, the protrusion 35 is raised slightly off from the stop 37 and thus, by the action of the spring 34, the tooth-flank clearance between the tooth flanks of the gearwheel 12 and the tooth flanks of the gearwheel 13 is compensated for or eliminated, which results in an avoidance of a change of tooth-flank abutment, which could have an unfavorable effect upon the printed image. A number of the arrangements formed by the parts 34 to 37 are provided, e.g., three such arrangements are provided, each offset in relation to one another an angle of 120° in the circumferential direction of the wheels 13.1 and 13.2.

In order for the assembly 5 to be moved up out of the active position again (note FIG. 2), after the varnishing, and into the passive position (note FIG. 1), the control device 38, by virtue of corresponding activation of the drive 14, positions the gearwheels 12 and 13 in those positions which the gearwheels 12 and 13 had assumed immediately following the coupling, and which are shown in FIG. 4. The assembly 5 is then drawn up by the chain transmission 17, the protrusion 20 sliding on the cam 19, and the cylinder 6 rotating back into the center-of-gravity position thereof again. When, following the decoupling of the gearwheels 12 and 13, the protrusion 20 is no longer in contact with the surface 22 of the cam 19, the drive 11 is drive-connected to the cylinder 6 again by engagement of the clutch 23b.

We claim:

1. A device for ensuring correct tooth engagement during coupling of an adjustable, first gearwheel to a second gearwheel of a printing-material processing machine, comprising a first adjustment device for adjusting the first gearwheel in a direction towards the second gearwheel during coupling, and further comprising a protrusion and a guide for guiding said protrusion during the coupling, said protrusion being disposed eccentrically to one of the two gearwheels and being connected to the one gearwheel, so that, during rotation of the one gearwheel about a central axis thereof, said protrusion is rotatable together with the one gearwheel.

2. The ensuring device according to claim 1, wherein the one gearwheel to which the protrusion is connected is the first gearwheel.

3. The ensuring device according to claim 1, wherein the first gearwheel is mounted in the first adjustment device, the first adjustment device adjusts said central axis of the first gearwheel along a straight line from a first position, wherein the first gearwheel is decoupled from the second gearwheel, into a second position wherein the first gearwheel is coupled to the second gearwheel.

4. The ensuring device according to claim 1, wherein said guide is a so-called open guide for guiding said protrusion only on one side.

5. The ensuring device according to claim 1, wherein the gearwheels are provided with a respective helical toothing, and said guide and said protrusion are adapted to said helical toothings.

6. The ensuring device according to claim 5, wherein said protrusion is formed with a supporting surface which is inclined in accordance with an angle of skew of said toothing of the first gearwheel.

7. The ensuring device according to claim 5, wherein a guide surface of said guide is inclined in accordance with an angle of skew of said toothing of the second gearwheel.

8. The ensuring device according to claim 1, wherein one of the gearwheels has assigned thereto a second adjustment device for adjusting the one gearwheel relative to the other of the two gearwheels in the axial direction of the one gearwheel.

9. The ensuring device according to claim 8, wherein the first gearwheel has assigned thereto said second adjustment device for adjusting the first gearwheel axially parallel to the second gearwheel.

10. The ensuring device according to claim 8, wherein, connected to the axially adjustable first gearwheel so as to be fixed against rotation relative thereto is a cylinder disposed coaxially with the first gearwheel, and said second adjustment device, together with the gearwheels, forms a device for adjusting a circumferential register of the cylinder.

11. The ensuring device according to claim 1, wherein said guide is connected to the other gearwheel.

12. The ensuring device according to claim 1, wherein one of the two gearwheels is formed of a basic wheel and an auxiliary wheel, said basic wheel and said auxiliary wheel having assigned thereto at least one spring for bracing in a circumferential direction.

13. The ensuring device according to claim 12, wherein the gearwheel formed of said basic wheel and said auxiliary wheel is said first gearwheel.

14. A printing-material processing machine having a device for ensuring correct tooth engagement during coupling of an adjustable, first gearwheel to a second gearwheel of a printing-material processing machine, the ensuring device comprising a first adjustment device for adjusting the first gearwheel in a direction towards the second gearwheel during coupling, and further comprising a protrusion and a guide for guiding said protrusion during the coupling, said protrusion being disposed eccentrically to one of the two gearwheels and being connected to the one gearwheel, so that, during rotation of the one gearwheel about a central axis thereof, said protrusion is rotatable together with the one gearwheel.

* * * * *